Patented Dec. 2, 1947

2,431,911

UNITED STATES PATENT OFFICE 2,431,911

AMIDO NAPHTHOL ETHERS

Elkan R. Blout, Cambridge, and Richard S. Corley, Boston, Mass., assignors to Polaroid Corporation, Cambridge, Mass., a corporation of Delaware No Drawing. Application September 9, 1946, Serial No. 695,824

1 Claim. (Cl. 260—562)

This invention relates to organic chemical compounds and is directed to a new compound of the Mannich base type.

By this invention there is provided a new compound, namely N-acetyl-O-methyl-1-(2'-naphthylaminomethyl)-2-naphthol which may be represented by the formula

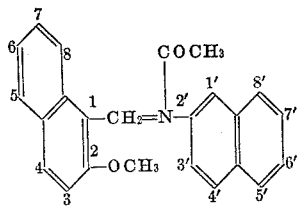

N-acetyl-O-methyl-1-(2'-naphthylaminomethyl)-2-naphthol represented above, as a pure compound may take the form of small colorless blocks exhibiting a melting point of about 129°–130° C. The compound is soluble in cold pyridine and hot n-butanol, moderately soluble in hot acetone and slightly soluble in benzene and in ethanol. The new compound is insoluble in water and insoluble in cold dilute alcoholic alkali.

N-acetyl-O-methyl-1-(2'-naphthylaminomethyl)-2-naphthol may be prepared by the acetylation of O-methyl-1-(2'-naphthylaminomethyl)-2-naphthol with acetic anhydride in acetone solution. O-methyl-1-(2'-naphthylaminomethyl)-2-naphthol is disclosed and claimed in copending application Serial No. 695,823 filed on even date herewith.

EXAMPLE 1

N-acetyl-O-methyl-1-(2'-naphthylaminomethyl)-2-naphthol may be prepared as follows:

To 3.40 grams of O-methyl-1-(2'-naphthylaminomethyl)-2-naphthol in 20 cc. of hot acetone were added 1.3 cc. of acetic anhydride (1 molar equivalent). The solution was permitted to boil down nearly to dryness. The residue upon crystallization from n-butanol produced 3.50 grams of N-acetyl-O-methyl-1-(2'-naphthylaminomethyl)-2-naphthol which exhibited a melting point of about 128°–129° C. For purposes of analysis N-acetyl-O-methyl-1-(2'-naphthylaminomethyl)-2-naphthol was crystallized five times from n-butanol and dried in vacuo at about 80° C. The product was pure N-acetyl-O-methyl-1-(2'-naphthylaminomethyl)-2-naphthol in the form of small colorless blocks. For determination of the melting point the sample was heated at a rate of 1° C. per 20 seconds. Under these conditions the compound exhibited a melting point of about 129°–130° C.

The pure N-acetyl-O-methyl-1-(2'-naphthylaminomethyl)-2-naphthol which has the empirical formula $C_{24}H_{21}NO_2$ showed by microanalysis the presence of 81.00% carbon and 6.36% hydrogen as compared with the calculated values of 81.12% carbon and 5.96% hydrogen.

Preparation of O-methyl-1-(2'-naphthylaminomethyl)-2-naphthol 2-methoxy-1-naphthaldehyde was prepared according to the method of Barger and Starling, J. Chem. Soc., 99, 2301 (1911). To a solution of 4.20 grams of 2-methoxy-1-naphthaldehyde in 20 cc. of hot methanol were added 3.20 grams of beta-naphthylamine in 20 cc. of methanol, and the mixture was boiled gently for 15 minutes. On cooling there was obtained 6.60 grams of impure (2-methoxy-1-naphthaldehyde)-beta-naphthylimine. One crystallization from n-butanol gave 5.70 grams of yellow needles of (2-methoxy-1-naphthaldehyde)-beta-naphthylimine which exhibited a melting point of about 122°–123° C. (2-methoxy-1-naphthaldehyde)-beta-naphthylimine is disclosed and claimed in copending application Serial No. 695,822 filed on even date herewith.

A solution of 5.00 grams of (2-methoxy-1-naphthaldehyde)-beta-naphthylimine in 150 cc. of ethyl acetate and 1 cc. of acetic acid was hydrogenated at about 45 pounds per square inch pressure and at room temperature with 0.1 gram of Adams' platinum oxide catalyst. The reduction was complete in 15 minutes. The catalyst was filtered, care being taken not to permit the catalyst unnecessarily to be exposed to the atmosphere and to dry during this operation in order not adversely to affect the yield. The solvent was removed in vacuo at 40° C. to produce a light yellow crystalline residue. The residue was crystallized from ether to give 3.72 grams of nearly colorless needles of O-methyl-1-(2'-naphthylaminomethyl)-2-naphthol exhibiting a melting point of about 111°–112° C. O-methyl-1-(2'-naphthylaminomethyl)-2-naphthol is disclosed and claimed in copending application Serial No. 695,823 filed on even date herewith.

Since certain changes may be made in the above subject matter without departing from the scope of the invention herein involved, it is intended that all matter contained in the above description shall be interpreted as illustrative and not in a limiting sense.

It is also to be understood that the following claim is intended to cover all of the generic and specific features of the invention herein described, and all statements of the scope of the invention which, as a matter of language, might be said to fall therebetween.

What is claimed is:

N-acetyl-O-methyl-1-(2'-naphthylaminomethyl)-2-naphthol represented by the following formula:

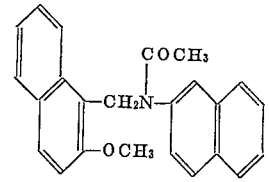

and which in the form of small colorless blocks exhibits a melting point of about 129°–130° C.

ELKAN R. BLOUT.
RICHARD S. CORLEY.